US010809926B2

(12) United States Patent
Legtchenko et al.

(10) Patent No.: US 10,809,926 B2
(45) Date of Patent: Oct. 20, 2020

(54) SERVER SYSTEM

(71) Applicant: Microsoft Technology Licensing, LLC, Redmond, WA (US)

(72) Inventors: Serguei Anatolievitch Legtchenko, Cambridge (GB); Mark Shaw, Redmond, WA (US); Austin Donnelly, Cambridge (GB); Hugh Williams, Cambridge (GB); Richard Black, Cambridge (GB); Antony Ian Taylor Rowstron, Cambridge (GB); Aaron Ogus, Redmond, WA (US); Douglas Phillips, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

(21) Appl. No.: 15/889,111

(22) Filed: Feb. 5, 2018

(65) Prior Publication Data
US 2019/0245922 A1 Aug. 8, 2019

(51) Int. Cl.
*G06F 11/00* (2006.01)
*G06F 11/20* (2006.01)
(Continued)

(52) U.S. Cl.
CPC ............ *G06F 3/0635* (2013.01); *G06F 3/067* (2013.01); *G06F 9/54* (2013.01); *G06F 11/2094* (2013.01);
(Continued)

(58) Field of Classification Search
CPC .. G06F 3/0635; G06F 3/0637; G06F 11/2094; H04L 41/0672
See application file for complete search history.

(56) References Cited

U.S. PATENT DOCUMENTS 7,194,538 B1 * 3/2007 Rabe ............... G06F 3/0605
709/220
7,657,613 B1 * 2/2010 Hanson ............ G06F 3/0605
707/812
(Continued)

FOREIGN PATENT DOCUMENTS

| EP | 2163996 A1 | 3/2010 |
| EP | 3041173 A1 | 7/2016 |
| WO | 2016209546 A1 | 12/2016 |

OTHER PUBLICATIONS

"International Search Report and Written Opinion Issued in PCT Application No. PCT/US2019/015490", dated Apr. 12, 2019, 10 Pages.
(Continued)

*Primary Examiner* — Michael Maskulinski

(57) ABSTRACT

A server system comprising storage devices, processing devices and a storage fabric all operating according to a storage fabric protocol. The storage fabric comprises a plurality of individual switches having a modular design from which an overall switch is built, and the individual switches have individual respective configuration settings which determine which processing devices are allocated to use which of the storage devices. The system comprises an API enabling a software control function to configure the overall switch. The API is operable to receive from the control function an overall mapping of the storage devices to the processing devices instead of requiring the individual configuration settings of each of the individual switches to be specified by the control function, the API being configured to convert the overall mapping into the individual configuration settings of the individual switches to produce the overall mapping.

20 Claims, 8 Drawing Sheets

(51) Int. Cl.
  *G06F 3/06* (2006.01)
  *H04L 12/931* (2013.01)
  *G06F 9/54* (2006.01)
(52) U.S. Cl.
  CPC ...... *H04L 49/356* (2013.01); *G06F 2201/805* (2013.01)

(56) References Cited

U.S. PATENT DOCUMENTS

| | | | |
|---|---|---|---|
| 7,739,432 | B1 | 6/2010 | Shaw et al. |
| 7,769,831 | B2 | 8/2010 | Johnson |
| 8,077,605 | B2 | 12/2011 | McCarty et al. |
| 8,244,948 | B2 | 8/2012 | Johnson et al. |
| 8,266,353 | B2 | 9/2012 | Nemazie et al. |
| 8,547,825 | B2 | 10/2013 | Armstrong et al. |
| 8,589,550 | B1 | 11/2013 | Faibish et al. |
| 8,743,872 | B2 | 6/2014 | Chidambaram et al. |
| 8,788,736 | B2 | 7/2014 | McKay et al. |
| 8,830,873 | B2 | 9/2014 | Tomic et al. |
| 9,087,012 | B1* | 7/2015 | Hayes .................. G06F 11/2094 |
| 9,172,659 | B1 | 10/2015 | Roitshtein |
| 10,122,605 | B2* | 11/2018 | Kulkarni ............. H04L 43/0817 |
| 2002/0156891 | A1 | 10/2002 | Ulrich et al. |
| 2005/0193178 | A1 | 9/2005 | Voorhees et al. |
| 2005/0268152 | A1* | 12/2005 | Yamaguchi ......... G06F 11/3409 |
| | | | 714/4.1 |
| 2006/0074927 | A1 | 4/2006 | Sullivan et al. |
| 2006/0173895 | A1 | 8/2006 | Engquist et al. |
| 2009/0083423 | A1 | 3/2009 | Basham et al. |
| 2009/0222733 | A1 | 9/2009 | Basham et al. |
| 2011/0128972 | A1 | 6/2011 | Thornton et al. |
| 2013/0304951 | A1 | 11/2013 | Goel et al. |
| 2014/0029467 | A1* | 1/2014 | Natrajan ............. G06F 13/4022 |
| | | | 370/254 |
| 2014/0156878 | A1 | 6/2014 | Hameed et al. |
| 2014/0208133 | A1 | 7/2014 | Gopal et al. |
| 2014/0317206 | A1 | 10/2014 | Lomelino et al. |
| 2015/0363109 | A1* | 12/2015 | Frick .................. G06F 11/2015 |
| | | | 711/112 |
| 2016/0091913 | A1 | 3/2016 | Pani |
| 2016/0188515 | A1 | 6/2016 | Lin |
| 2016/0239234 | A1 | 8/2016 | Berger et al. |
| 2016/0277214 | A1 | 9/2016 | Guntaka et al. |
| 2017/0109185 | A1 | 4/2017 | Khemani |
| 2018/0109446 | A1 | 4/2018 | Srinivasan et al. |
| 2019/0245923 | A1 | 8/2019 | Williams et al. |

OTHER PUBLICATIONS

"A54812-SW SAS Switch", Retrieved From <<https://www.google.co.in/url?sa=t&rct=j&q=&esrc=s&source=web&cd=2&cad=rja&uact=8&ved=0ahUKEwi8maCRpJ3YAhWGu48KHUqlCagQFggtMAE&url=https%3A%2F%2Fwww.astekcorp.com%2Fproducts%2Fstorage%2Fswitches-expanders%2F12g-switch%2Fproduct%2Fdownload%2Ffile_id-433&usg=AOvVaw3iC60CIU6CzlhRLV5RR7LJ>>, Apr. 12, 2016, 61 Pages.

"LSI SAS6100 Series 6Gb/s SAS Switch", Retrieved From <<https://www.acnc.com/media/pdf/31_f_LSI_SAS6100_Series_Switch_pb.pdf>>, Mar. 2010, 2 Pages.

"NetApp® E-Series Storage Systems", Retrieved From <<https://library.netapp.com/ecm/ecm_get_file/ECMP1394868>>, Dec. 2013, 144 Pages.

Kalmanek, et al., "Xunet 2", In Proceedings of IEEE/ACM Transactions on Networking, vol. 5, No. 1, Feb. 1997, pp. 40-55.

Massoud, Pedram, "Energy-Efficient Datacenters", In Proceedings of IEEE Transactions on Computer Aided Design of Integrated Circuits and Systems, vol. 31, N 10., Oct. 1, 2012, pp. 1465-1484.

"International Search Report and Written Opinion Issued in PCT Application No. PCT/US19/015491", dated May 3, 2019, 12 Pages.

Poellabauer, et al., "Kernel support for the event-based cooperation of distributed resource manager", In Proceedings of Eighth IEEE Real-Time and Embedded Technology and Applications Symposium, Sep. 24, 2002, pp. 3-12.

"Non Final Office Action Issued in U.S. Appl. No. 15/889,129", dated Oct. 28, 2019, 15 Pages.

"Final Office Action Issued in U.S. Appl. No. 15/889,129", dated Apr. 7, 2020, 13 Pages.

"Non Final Office Action Issued in U.S. Appl. No. 15/889,129", dated Jul. 29, 2020, 13 Pages.

* cited by examiner

SERVER SYSTEM

TECHNICAL FIELD

The present disclosure relates to a server system comprising a plurality of processing devices, a plurality of storage devices, and a storage fabric connecting the storage devices to the processing devices, wherein the storage fabric comprises a plurality of switches such as SAS switches.

BACKGROUND

"Storage fabric" is a term of art referring to a low-level network used within a data centre to connect servers to disks or other such storage drives, typically within a single server chassis (e.g. rack) or a small number of adjacent chassis. Note that in the context of a storage fabric, "server" refers specifically to a serving processing device but not the storage drives to which it is connected via the storage fabric (as opposed to the use of the term the context of the wider, external network, where "server" sometimes refers to the whole serving computer system including processing and storage). Each server (serving processing device) may comprise one or more processing units such as CPUs or work accelerator processors. Each storage device may take the form of a disk drive or other such storage drive. The storage fabric may for example take the form of a storage area network (SAN).

A server may include some amount of on-board non-volatile memory, but only for the purpose of storing code to be run by the server or temporarily holding data. The server does not perform the long-term storage of user content which is the subject of the service(s) being provided. A storage device may comprise a low-level embedded processor, but only for the purpose of running firmware relating to the storage functionality, not for user functions, or at least not for performing any arbitrary function. E.g. the embedded processor of a storage device such as a disk could not run firewall software. Storage devices also cannot perform routing by themselves.

A storage fabric may comprise one or more switches for routing communications between the servers and the storage devices. Such communications may take the form of two-way transactions such as: a command from a server to read data from a storage device, followed by a corresponding response from the storage device returning the requested data; or a command from a server to store data in a storage device, followed by a corresponding response from the storage device confirming that a storage operation has been completed.

A server system's internal storage fabric differs in a number of respects from the wider, external network (e.g. the Internet) via which the server system serves its clients. For instance a storage fabric may have any one, more or all of the following properties.

Servers can only be initiators and storage devices can only be targets, where initiators initiate actions by targets. That is, storage devices cannot initiate a transaction between server and storage device (i.e. cannot send a message autonomously), but can only respond to an initiating command from a server. Only servers can initiate a transaction.
Servers cannot communicate with other servers via the fabric, and storage devices cannot communicate with other storage devices.
Storage devices cannot act autonomously: they are required to be controlled by a server (the ownership principle).
Any given storage device is only allowed to be controlled by a single server at a time.
Multiple paths between a given server and a given storage device are not allowed. I.e. the topology of the storage fabric must be that of an acyclic graph, such as a tree. If multiple possible paths exists, the behaviour of the fabric is undefined.
Communications over the storage fabric are lossless.
Communications over the fabric operate according to a bounded latency principle (i.e. maximum or limited latency). That is, the recipient returns an acknowledgment in response to a message transmitted from the sender, and if the acknowledgment is not received by the initiator after a maximum time period then the transmission is deemed to have failed. Where communications are also lossless, this means retransmission of failed messages.
In-order transmission: the messages sent over the fabric are divided into packets and the storage fabric protocol ensures that the packets are delivered to the recipient in the same order that they were sent. E.g. in a storage scenario it may be desired to ensure that a first piece of data is written before a second piece of data.

An example of a storage fabric protocol is SAS (Serial Attached SCSI). An SAS switch is a standard monolithic device with a fixed number of connectors, typically twelve. SAS switches can be connected together by cables between some of these connectors. The core functional component of an SAS switch is an SAS expander. To determine which storage devices is permitted to be controlled by which server, each switch maintains a permissions table against which it performs a permission check before routing traffic onward towards its requested destination.

Examples of other storage fabric protocols that operate on similar principles include SATA, Fibre Channel, and PCI.

SUMMARY

Currently the permission table for each individual switch has to be configured individually and manually by the human manager of the server via an out-of-band server management application run on a management terminal connected to the rest of the server system. This is a cumbersome task. Further, if a component fails or demand for services shifts such that the current mapping of servers to storage devices is undesirable or even non-functional, then the human manager has to manually and individually reconfigure the permissions table of each switch in the storage fabric to create a new mapping. It would be desirable to alleviate one or more such issues or similar.

According to one aspect of the present disclosure, there is provided server system comprising a plurality of components including at least: a plurality of processing devices arranged to serve one or more services to one or more client systems via an external network; a plurality of storage devices for use by the processing devices to store data relating to said services; and a storage fabric connecting the processing devices to the storage devices, the storage fabric, processing devices and storage devices being arranged to operate according to a storage fabric protocol in order to communicate between the processing devices and the storage devices over the storage fabric. The storage fabric comprises a plurality of individual switches, and the individual switches have a modular design by which an overall switch is built from the plurality of individual switches. The individual switches have individual respective configuration settings, which between them determine which of the processing devices are allocated to use which of the storage devices in providing said services to the client systems. The server system further comprises an API enabling a software control function to configure the overall switch. The API is operable to receive from the control function an overall mapping of the storage devices to the processing devices instead of requiring the individual configuration settings of each of the individual switches to be specified by the control function, the API being configured to convert the overall mapping into the individual configuration settings of the individual switches to produce said overall mapping.

The modular nature of the switches enables any desired topology to be readily created (within the constraints of the storage fabric protocol). Further, the API presents the overall switch as a single unified switch to the control function, which could be a human-operated management application or an automated control function. This advantageously enables any desired mapping of servers to be readily created or later modified, either by a human manager or dynamically by an automated control function.

In a particularly advantageously application of the presently disclosed techniques, the components are arranged into failure domains, whereby the data relating to one of said services is duplicated across two or more of the storage devices in different ones of the failure domains, the domains being divided such that if one of the components or a link therebetween fails or is shut down in one of the domains, then the data is still accessible from the storage device in another of the domains.

The modularity advantageously facilities the arrangement of the components into smaller or more optimally sized failure domains that limit the "blast radius" of a failed component, such as a failed one of the storage devices, or a failed switch, or a failed link between switches or between switch and storage device. The designer can readily design the topology of the fabric and/or the mapping of servers to storage devices so as to create failure domains that accommodate the possibility of failure in one or more failure scenarios and the effect that this would have, preferably so that the data is always available. Alternatively or additionally, in embodiments the mapping or even the topology itself can be dynamically adapted in event of failure.

The storage devices may for example take the form of magnetic storage devices, solid state storage devices, or optical storage devices. The services may comprise for example cloud storage, said data comprising the stored content (user data) submitted to be stored by the client systems. Other alternative or additional possibilities include online shopping, a collaborative workspace, an archive service, etc.

The API takes the form of software stored on computer-readable storage and arranged to run on one or more processors. The API may be implemented on any of the components of the server system or another component. API may be implemented on server, or as firmware on an embedded processor of one of the switches or storage devices, or on another component of the server system; or a separate out-of-band computer.

The control function also takes the form of software stored on computer-readable storage and arranged to run on one or more processors. The control function may be implemented on any of the components of the server system or another component.

For example in embodiments, the control function may comprise an in-band control function implemented on at least one of said components themselves. In embodiments, the at least one component on which the in-band control function is implemented may comprise at least one of the processing devices.

Alternatively or additionally, the control function could be implemented as firmware on an embedded processor of one or more of the switches or storage devices, and/or another component of the server system.

As another possibility, the control function may comprise an out-of-band management function run on a server management computer separate from said components.

In embodiments, the control function may be configured to dynamically reconfigure the mapping of processing devices to storage devices automatically in response to one or both of: failure or other downtime of one of the components or a connection between the components, and/or changes in demand for the services from the client systems.

In embodiments, the API may be configured to communicate in-band with the switching fabric to discover a topology of the switching fabric, and to make an indication thereof available to the control function and/or one of said components.

In embodiments, the modular design of the individual switches may comprise connectors between the individual switches having a mechanical design enabling a management function to determine a relative physical orientation of the switches, and based thereon to report a position of a failed one of the switches to a human manager.

In embodiments the management function may enable a human manager to manually specify said overall mapping.

In embodiments, some or all of the components including at least some of the processing devices, at least some of the storage devices and at least some of the switches connecting between these processing devices and storage devices may all be installed in a same server chassis as one another.

In embodiments, according to said storage fabric protocol, one, more or all of: (a) none of the processing devices is allowed multiple paths to a same one of the storage devices; (b) only one of the processing devices is allowed to control any given one of the storage devices at any one time; (c) none of the storage devices is able to operate without being allocated one of the processing devices to control it; (d) only the processing devices and not any of the storage devices can initiate transactions across the storage fabric; (e) the processing devices can only communicate with their allocated storage devices over the storage fabric, but none of the processing devices can communicate with any other of the processing devices across the storage fabric, and nor can any of the storage devices communicate with any other of the storage devices across the storage fabric; (f) the storage devices connect to the external network only via the processing devices to which they are allocated and not directly; (g) the communications are conducted according to a bounded latency principle, whereby if the device which initiated the communication does not received an acknowledgment back from the device which is the target of the communication within a maximum time delay, then the communication fails; (h) the communications conducted over the storage fabric according to said storage fabric protocol are lossless; and/or (i) the communications over the storage fabric are divided into packets and the storage fabric enforces in-order deliver of the packets.

In embodiments the storage fabric protocol may be SAS, SATA, Fibre Channel, or PCI.

In embodiments the external network is an IP network. In embodiments the external network may comprise the Internet.

According to another aspect disclosed herein, there is provided a method of operating a server system comprising a plurality of components including at least a plurality of processing devices arranged to serve one or more services to one or more client systems via an external network, a plurality of storage devices for use by the processing devices to store data relating to said services, and a storage fabric connecting the processing devices to the storage devices; the method comprising: arranging the storage fabric, processing devices and storage devices to operate according to a storage fabric protocol in order to communicate between the processing devices and the storage devices over the storage fabric; assembling the storage fabric from a plurality of individual switches, and the individual switches have a modular design by which an overall switch is built from the plurality of individual switches, wherein the individual switches have individual respective configuration settings, which between them determine which of the processing devices are allocated to use which of the storage devices in providing said services to the client systems; providing an API enabling a software control function to configure the overall switch; and operating the API to receive from the control function an overall mapping of the storage devices to the processing devices instead of requiring the individual configuration settings of each of the individual switches to be specified by the control function, and operating the API to convert the overall mapping into the individual configuration settings of the individual switches to produce said overall mapping.

According to another aspect disclosed herein, there is provided a program for operating a server system comprising a plurality of components including at least a plurality of processing devices arranged to serve one or more services to one or more client systems via an external network, a plurality of storage devices for use by the processing devices to store data relating to said services, and a storage fabric connecting the processing devices to the storage devices; the program comprising code embodied on a computer readable medium and arranged so as when run on one or more processors to perform operations of: operating the storage fabric, processing devices and storage devices according to a storage fabric protocol in order to communicate between the processing devices and the storage devices over the storage fabric, wherein the storage fabric comprises a plurality of individual switches, and the individual switches have a modular design by which an overall switch is built from the plurality of individual switches, and wherein the individual switches have individual respective configuration settings, which between them determine which of the processing devices are allocated to use which of the storage devices in providing said services to the client systems; providing an API enabling a software control function to configure the overall switch, the API being operable to receive from the control function an overall mapping of the storage devices to the processing devices instead of requiring the individual configuration settings of each of the individual switches to be specified by the control function, the API being configured to convert the overall mapping into the individual configuration settings of the individual switches to produce said overall mapping.

BRIEF DESCRIPTION OF THE DRAWINGS

To assist understanding of embodiments of the present disclosure and to illustrate how such embodiments may be put into effect, reference is made, by way of example only, to the accompanying drawings in which.

DETAILED DESCRIPTION OF EMBODIMENTS

Figure 1:
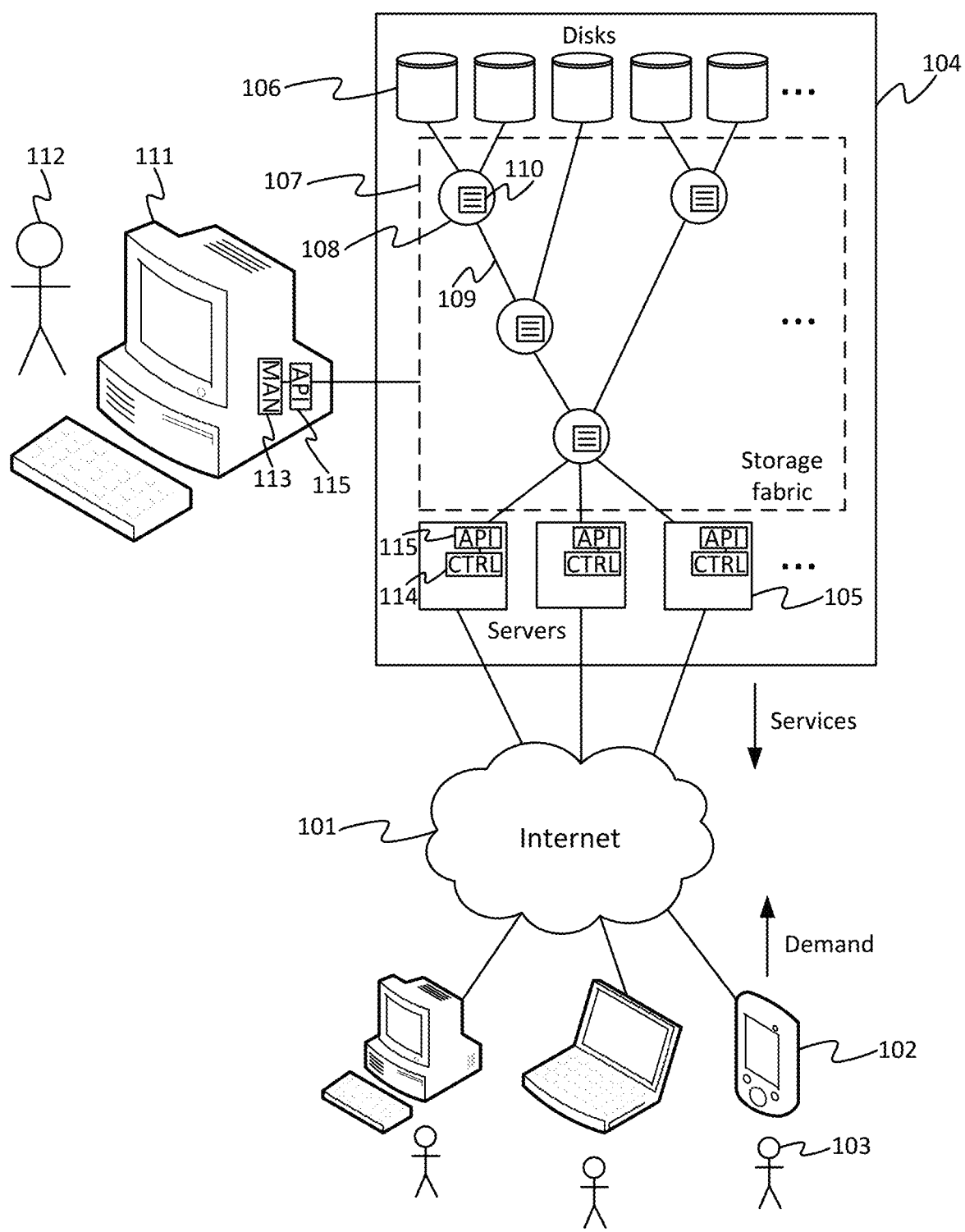
FIG. 1 schematically illustrates a server system and client systems.

The present disclosure provides a method and system for constructing multiple sizes of SAS switch from modular components where the resulting compound switch appears unified to out of band management and in-band control, but retains the failure isolation properties of the individual modules.

Conventional SAS switches lack modularity. The SAS standard defines that there must not exist multiple paths between a pair of SAS addresses in a topology. Therefore, a server attached to a set of storage devices through a topology of expanders will experience storage device unavailability under expander failures. In that context, it would be desirable to ensure the right level of failure isolation, i.e. that the failure of an expander has the smallest possible impact on device availability. This can be achieved by reducing the radix of the expanders in the topology. On the other hand, servers in data centre racks are often attached to a large number of storage devices, and it is cost-effective to minimize the number of the expanders by increasing their radix. The best expander radix is the one that takes both requirements into account, and is likely to be different for each type of data centre rack. Current SAS switches have been designed for the enterprise and are composed of a single high-radix expander. Ensuring the right level of failure isolation using such SAS switches is not cost-effective.

The present disclosure provides a method of constructing multiple sizes of SAS switches from modular components. It allows to provision a balance between failure isolation and cost that is adapted to every type of storage rack in the data centre. For example, it is possible to provision a large number of modules in the switch such that the radix is increased beyond the maximal radix of a standard SAS switch, which is useful for cold data storage racks. In contrast, it is possible to provision a smaller number of modules, to adjust the failure isolation to a subset of logically-related devices.

A standard SAS switch is a monolithic appliance that typically has twelve connectors. The number of connectors cannot be changed at provisioning, and the way of increasing failure isolation is to use more SAS switches and leave a number of connectors depopulated on each switch. This is wasteful in terms of switching resources and physical space in the rack. SAS switches are typically designed for the enterprise, and do not interface well with the management fabric in the data centre. In contrast, the presently disclosed system and method allow the data centre designer to provision SAS components appropriately to the demand, interface them with the data centre management fabric, and abstract the complexity of the topology away from the application.

The modular SAS switch may take the form of a rack-mountable appliance. It has a set of slots that can be populated with components that provide SAS connectivity (e.g. SAS expanders). These components can be interconnected internally into a minimal topology, but will expose a set of SAS ports to the front of the modular SAS switch.

When the rack is provisioned, the externally-exposed ports are connected to the servers and enclosures within the rack. The modular switch hence appears as one physical unit. Also provided is a software library that is used by the application for in-band control the modular SAS switch. If needed, the library presents the modular SAS switch as a single monolithic SAS switch, abstracting the topology of the SAS components. For that, the physical ordering of the modules in the switch needs to be determined. The ordering can be inferred from the internal topology of the modular SAS switch, assuming that the internal connectivity has been designed to allow the ordering inference (for example, the internal topology may be some variant of a chain to allow ordering).

The slots of the SAS switch may be populated with SAS expanders, but could host any type of component that can forward SAS traffic. Examples of such other components include an electrical circuit switch or an FPGA.

More generally, according to one aspect of the present disclosure there is provided method of adjusting the failure isolation of a SAS topology by using SAS switches built from modular components. According to another aspect disclosed herein, there is provided an apparatus that hosts multiple SAS components and exposes through in-band control the topology in which these components are connected. According to another aspect disclosed herein, there is provided a system that uses in-band control to discover the topology of the modular switch, and exposes it as a one unified device to out of band management and in-band control. In such a system, in embodiments there may be provided a method of inferring the ordering of SAS components from their topology.

Also, whilst embodiments above and below are exemplified in terms of an SAS storage fabric, the principles disclosed herein may also apply to storage fabrics configured according to other protocols such as SATA, Fibre Channel or PCI. Any concept described herein of an SAS storage fabric, SAS switch, SAS protocol, or the like, may equally apply to other types of storage fabric, storage fabric switch, storage fabric protocol, etc.

By way of illustration FIG. 1 shows an example communication system comprising a server system 104, an external network 101, and a plurality of client systems 102 served by the server system 104 via the network 101. The external network 101 may take the form of an IP network. It may comprise a wide-area internetwork such as the Internet. Alternatively or additionally it may comprise for example a mobile cellular network, company intranet (e.g. Ethernet network) or local wireless area network (WLAN) such as a Wi-Fi network. Each of the client systems 102 comprises at least one respective user terminal of any suitable form, such as a desktop computer, laptop computer, tablet, smartphone, or even a wearable device such as a smart-watch or smart-glasses. Each client system 102 is used by at least one respective user 103. The server system 104 is arranged to provide (i.e. serve) one or more services such as cloud storage, collaborative workspaces, online shopping, data archives, etc., to the client systems 102 via the exterior network 101 for consumption by the respective users 103 through their respective client systems 102. The services are served in response to demand form the users 103 expressed through their client systems 102. I.e. a given user 103 uses a client application run on his/her respective client system 102 to select to access a service, causing a corresponding request to be submitted to the server 104 via the network 101. The demand for such services is detected at the server system 104 in the form of such requests from the client applications on the client systems 103. In response the server system 104 serves the requested service to the requesting client application on the respective client system 103 via the network 101. In some cases the provision of the services may be subject to one or more additional conditions such as authentication of the user 103, or a payment.

The server system comprises a plurality of servers 105 (i.e. serving processing devices), a plurality of dedicated storage devices 106 (storage drives), and a storage fabric 107 which connects the servers 105 to the storage devices 106. Each server 105 comprises at least one processor for performing the processing involved in the provision of at least one of the services being provided to the client systems 102. The processor(s) of each server 104 may comprises at least one CPU, and in some cases may comprise one or more additional processors such as one or more work accelerator processors dedicated to some specific task such as graphics or machine learning. Each storage device 106 may take any suitable form such as a magnetic storage device (e.g. magnetic disk drive), electronic storage device (solid state drive), optical storage device, or nowadays more exotic forms such as biological DNA based storage are even being explored.

The storage fabric 107 is a low-level, internal network contained within the server system 104 itself, connecting together the storage devices 106 and servers 105 in a certain topology. The topology herein refers to the way the physical interconnections are arranged within the storage fabric 107. In embodiments the servers 105, storage devices 106 and storage fabric 107 are all contained within a single appliance or server chassis, or a small number of adjacent server chassis. The chassis may for example comprise a server rack. The chassis may comprise one or more enclosures.

The storage fabric 107 may comprise one or more individual switches 108; plus physical links 109 between individual switches 108, or between switches 108 and servers 105 or switches 108 and storage devices 106. I.e. some of the links 109 may connect between a pair of individual switches 108, some of the links 109 may connect between an individual switch 108 and a server 105, and some of the links 109 may connect between an individual switch 108 and a storage device 106. Thus the servers 105, storage devices 106 and switches 108 are connected together in a certain storage fabric topology: i.e. which of the components (servers 105, storage devices 106 and switches 108) are physically connected to which others of the components in the storage fabric 107 via ones of the links 109. Note that the topology shown in FIG. 1 is purely by way of schematic illustration.

The servers 105 are arranged to control respective allocated ones of the storage devices 106 via the storage fabric 107, for the purposes of providing the respective services to the client systems 101. So for example if providing a cloud storage service, a server 105 may be allocated one or more of the storage devices 106 which it can control to store and retrieve the user content desired to be stored by the respective user(s) 103. Or if providing a collaborative workspace service, a server 105 may be allocated one or more of the storage devices 106 which it can control to store and access the shared documents being worked on by the collaborating users 103. Or if providing an online shopping service, a server 105 may be allocated one or more of the storage devices 106 which it can control to access product information to serve to the users 103, store customer and/or payment information from the users 103, etc. Each server 105 may be arranged to provide a different respective service 105, or some servers 105 may be arranged to work together to provide a given one or more services.

Each individual switch 108 has an individual configuration setting 110 in the form of a permissions table. Between them the permissions tables 110 of the different individual switches 108 determine which of the servers 105 are permitted to control which of the storage devices 106. In embodiments each individual permissions table 110 may store the full permissions list for all the storage devices 106 and servers 105 in the whole storage fabric. Alternatively each individual permission table 110 may hold only the permissions relevant to the servers 105 and storage devices 106 within a certain zone (a certain sub-region of the storage fabric 107), or within the sphere of influence of the respective individual switch 108. For example the switch 108 in the top left in FIG. 1 may only need to know which server(s) 105 are allocated to control its respective two storage devices 106. For example the SAS specification defines the concept of a SAS zoned portion of a service delivery subsystem (ZPSDS). The ZPSDS is subdivided into zones. Every switch that is part of the same ZPSDS must know the permissions for all the targets and initiators in that ZPSDS. ALL the switches in each ZPSDS must have the same zone permission table for that ZPSDS. A switch may only be part of at most one ZPSDS.

When an individual switch 108 receives a message to be routed to a certain destination (storage device 106 or server 105), originating from a certain source (server 105 or storage device 106 respectively), then this current local switch 108 first checks the source and destination addresses of the message against the current switch's respective permissions table 110 to determine whether the message is permitted to be routed to that destination. Only if so does the local switch 108 route the message onwards to the next node (which could be a next individual switch 108 or the destination). The message may for example be a command from a server 105 to store or access data in/from a certain target one of the storage devices 106, or an acknowledgment or return of data back from the storage device 106 to the server 105.

The storage fabric 107 is configured to operate according to a suitable storage fabric protocol such as SAS (Serial Attached SCSI, where SCSI stands for Small Computer System Interface). As mentioned, other suitable storage fabric protocols include SATA (Serial Advanced Technology Attachment), Fibre Channel, or PCI (Peripheral Component Interconnect).

Figure 2:
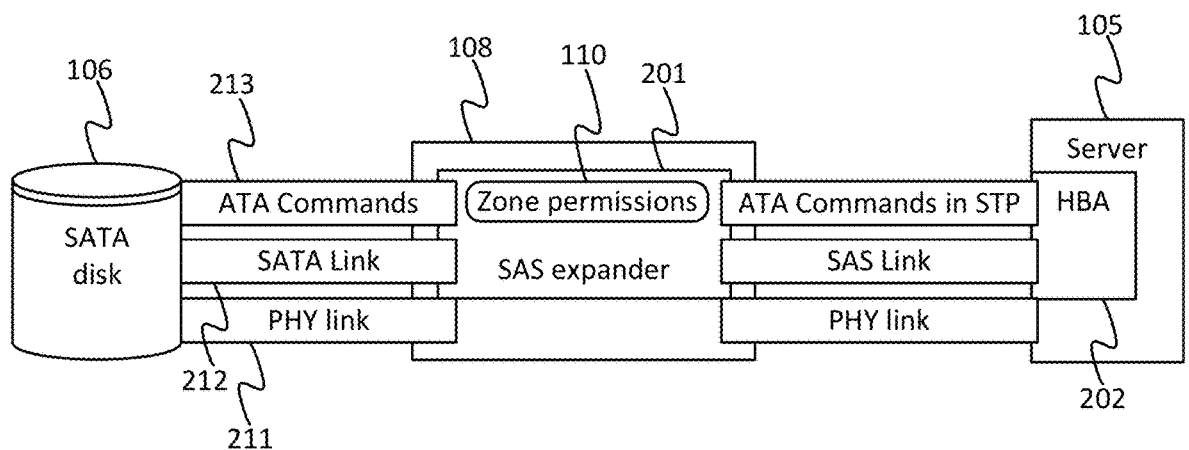
FIG. 2 schematically illustrates the layers of the SAS protocol.

FIG. 2 schematically illustrates the layers of the SAS protocol. SAS has three layers 211, 212, 213. The lowest layer 211 is the PHY layer which is point-to-point, with four PHY links in each cable. The middle layer 212, the SAS layer, comprises HBAs (Host Bus Adapters) 202, expanders 201 and storage devices (e.g. disks), and forms an undirected acyclic graph where the expanders 201 perform routing.

Each individual switch 108 comprises an expander 201 which is the functional component of the switch 108 for the purpose of routing. Each server 105 comprises an HBA 202 which provides the complementary layer of functionality in the server 105. The top layer 213 is a connection between initiator and target, which is subject to zone permission checks in the expanders. As will be discussed in more detail layer, embodiments of the present disclosure can use flexibility at the top and bottom layers 211, 213 to get around the restriction of no cycles being allowed in the SAS layer 212.

In the SAS protocol, "PHY" refers to an electrical link, which can be 3, 6 or 12 Gbps. "Cable" refers to four PHY links in one bundle with connectors. The PHY sits on top of the physical layer and is the lowest layer that understands bits. The PHY devices on the extremities of a physical link therefore agree how to translate electrical signal into bits. This is called PHY negotiation. Once agreement is reached, the bit channel is established. This is what is called the PHY. "Port" refers to a protocol connection over at least one PHY link. The expander 201 performs protocol routing over ports. A "domain" refers to set of devices reachable by routing. A "zone" refers to a subset of devices in a domain that can communicate.

Returning now to FIG. 1, the permissions tables 110 (or more generally configuration settings) of the individual switches 108 are programmed by submitting respective control commands to the individual switches 108 in the relevant storage fabric protocol, e.g. SAS commands in the present example. To program the permissions tables 110 (or configuration settings), conventionally a human manager 112 has to individually program the respective configuration settings (e.g. permissions tables) 110 of each individual switch 108 in the storage fabric 107, from a management application run on a server management terminal 111 which is connected out-of-band to the storage fabric 107 (e.g. A SAS switch typically has an Ethernet port and the management computer 111 can be connected to that port via an Ethernet network). This programming of the permissions settings is a cumbersome task requiring a skilled operator. Further, it does not allow the server system 104 to adapt in anywhere near real time to changes in current conditions such as shifts in demand for one or more of the services, or failure of a component (storage device 105, server 106 or switch 108). Typically the manager 112 might perform a reconfiguration, say, only once a month or something or that order, or perhaps sometimes in response to a critical failure. Furthermore, it is typically difficult for the designer of the data centre to plan for failure using conventional monolithic SAS switches or the like.

Storage fabrics 107 are not like other networks such as the Internet 101, particularly in that storage fabrics are much more limited. There are constraints on physical their topology, such as not allowing multiple paths between a server 105 and a storage device 106. There are also other constraints on the logical configuration, such as that only one of the servers 105 can control a given one of the storage devices 106 at any one time (i.e. a storage device 106 can have only one master). In general, any or all of the constraints outlined in the background section may apply to the storage fabric 107. Such constraints make it difficult for the designer to plan for failure of a component, or for the manager 112 to respond to failure or other changes such as shifts in demand.

Figure 3:
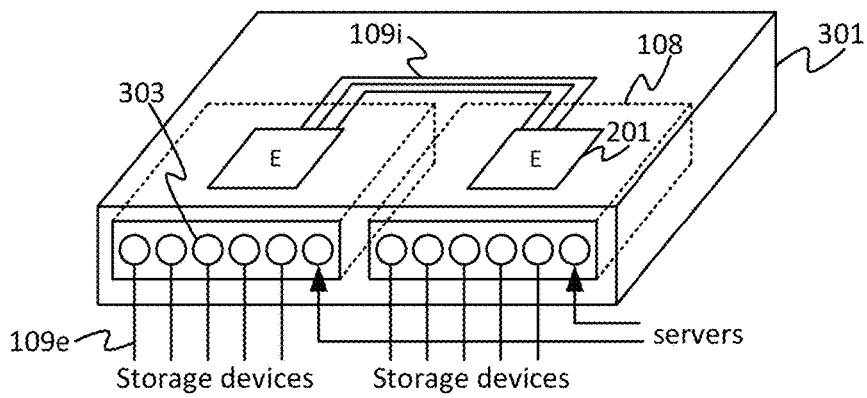
FIG. 3 schematically illustrates a modular switch formed from multiple individual switches, FIG. 4 schematically illustrates an API between a modular switch and a control function, FIG. 5 schematically illustrates a division of components into failure domains, FIG. 6 schematically illustrates a topology disallowed by SAS, FIG. 7 schematically illustrate use of electrical switches to adapt a topology, FIG. 8 schematically illustrates an example arrangement for adapting a topology, FIGS. 9a-9d schematically illustrate example adaptations in event of failure scenarios, FIG. 10 schematically illustrates a modular mechanism for joining switches, and FIG. 11 schematically illustrates another modular mechanism for joining switches.

To address any one or more of the above issues or similar, as illustrated by way of example in FIG. 3, embodiments disclosed herein provide a modular switch 301 composed of multiple individual switches 108, e.g. SAS switches. The individual component switches 108 preferably have a mechanical design which enables them to be mechanically assembled into a common physical unit. For example the individual switches 108 may have mechanical couplings enabling them to be mechanically attached to one another, or to a common supporting structure such as a board. E.g. they may be designed to slot into a common supporting structure such as a boards. In embodiments, the individual component switches 108 may assemble into a common housing, either formed from the abutting housings of the individual switches or an additional casing formed around the individual switches 108.

By whatever means the individual component switches 108 are mechanically assembled, they are also electrically connected to one another by one or more internal links 109*i*. The switches 108 also present one or more external connectors 303 to the exterior of the modular switch 301, each such connector 303 providing the physical connection for one or more protocol ports. E.g. a connector is typically connected to multiple SAS ports. Each connector 303 may take the form of a plug or socket having a plurality of pins. The external connectors 303 enable the servers 105 and storage devices 106 to be connected to the modular switch via external links 109*e* (e.g. in the illustrated example the lines shown schematically). The storage fabric 107 may thus be formed from the modular switch 301 plus the external links 109*e* to the servers 105 and storage devices 106.

The modular nature of the overall modular switch 301 enables the data centre designer to build a switch that is appropriately dimensioned for the application at hand, and also (as will be discussed in more detail shortly, to plan for the possibility of failure of various components by arranging the components into suitable failure domains.

Further, embodiments disclosed herein provide an application programming interface (API) 115 which enables the overall modular switch 301 to be controlled as if it was a single switch. In embodiments the API 115 may comprise one or more software libraries, as mentioned earlier. The API 115 provides an interface between the modular switch 301 and a software component in the form of a software control function. This control function may comprise an out-of-band management function 113. Alternatively or additionally, the control function may comprise an in-band control function 114. "Out-of-band" means the control is performed outside of the path of the data. I.e. so the control commands sent from the API 115 to the individual switches 108 do not travel via one of the same links 109 used to exchange data between the storage devices 106 and disks 105. For example the out-of-band management function 113 may be implemented on the management computer 111. In embodiments the switch appliance includes a board management controller (BMC) that can be controlled though a management network (e.g. Ethernet) and can also talk to the switches 108. "In-band" means the control is performed in the path of the data. I.e. so the control commands sent from the API 115 to the individual switches 108 do travel via at least some of the same links 109 used to transfer data between the storage devices 106 and the servers 105. For example the in-band control function 114 may take the form of an automated function implemented on one, more or all of the servers 115. In the case of an implementation across multiple servers, the instances of the control function 114 on the different servers are arranged to agree on the control. This can be done for example through an external master entity, or by running state of the art consensus algorithms.

The API 115 itself may be implemented on any suitable component or components of the server system 104. E.g. it could be arranged to run one or more of the servers 105, the management computer 111, or even on an embedded processor of one or more of the switches 109 or storage devices 109, or any combination of these. In embodiments the API is implemented in the software on the servers 105 that are connected to the storage fabric 107.

Figure 4:
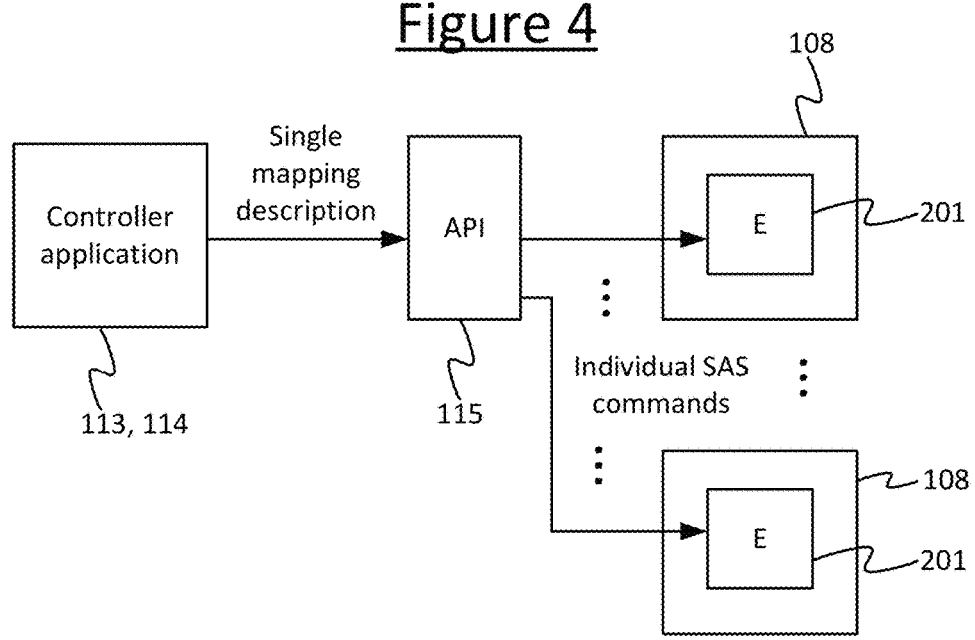

The operation of the API 115 is illustrated by way of example in FIG. 4. The API 115 receives from the control function 113, 114 an indication of a desired mapping of servers 105 to storage devices 106 only in terms of a single description of the overall mapping—i.e. the API 115 only needs to receive from the control function 113, 114 an indication which servers 105 are allocated to control which storage devices 106, as opposed to receiving the individual configuration settings 110 (e.g. permission table settings) required to configure each of the individual switches 108 to enact this overall mapping. Furthermore, this indication does not need to be received in the form of a SAS command or commands. Instead, the API 115 is configured to automatically translate this indication of the overall mapping, as received from the control function 113, 114, into the individual respective configuration settings 110 for each of the individual switches 108 and to supply these settings to each of the individual respective switches 108 accordingly. In the case of an SAS storage fabric 107, this means translating into multiple individual respective SAS control commands to configure the respective individual permissions tables 110 on each of the respective individual switches 108.

The out-of-band management function 113 may take the form of the management application arranged to run on the management computer 111. It may enable the human manager 112 to manually set up or change the configuration of the modular switch 301 via the API 115, by specifying the desired mapping of servers 105 to storage devices 106 rather than having to specify each individual switch configuration 110. This enables the human manager 112 to more readily set-up or adapt the mapping when this is required to be done manually.

Alternatively or additionally, the in-band control function 114 may take the form of an automated control function 114 for dynamically adapting the mapping of servers 105 to storage devices 106, and/or in some embodiments even dynamically adapting the internal topology of the modular switch 301 by means of electrical switches 701 that can switched the electrical links 109 formed between nodes 105, 106, 108 (discussed in more detail later with reference to FIGS. 7*a*, 7*b* and 8). In yet further alternative or additional embodiments, the out-of-band management function 113 may be configured to perform such automated dynamic adaptation (either as an alternative or in addition to the in-band-function, and as an alternative or in addition to allowing the human manager 112 to make manual changes).

In-band control has the advantage that the system 104 can reconfigure itself without the need for outside intervention. However, out-of-band control may also be desirable in case of internal failure to such a degree that the system 104 can no-longer reconfigure itself.

The dynamic adaptation may be used to adapt the mapping of servers 105 to storage devices 106, and/or the topology of the modular switch 301, in response to demand by the client systems 102 for the services being served. That is, the control function 113, 114 is configured to detect the demand from the client systems and in response, to dynamically adapt the mapping and/or topology so as to better accommodate the demand for the services amongst the storage devices 106 and/or servers 105.

Alternatively or additionally, the dynamic adaptation may be used to adapt the mapping of servers 105 to storage devices 106, and/or the topology of the modular switch 301, in response to failure of one of the components 105, 106, 108, 109 of the storage network. That is, when a component 105, 106, 108, 109 fails, the control function 113, 114 may automatically detect this and in response automatically adapt the mapping of servers 105 to storage devices 106, and/or automatically adapt the topology of the modular switch 301, in order to ensure that a service which might otherwise have been disrupted by the failure is still available to the client systems 102 (e.g. to ensure that stored data is still accessible).

Preferably the modular switch 301 is used to build a topology for the fabric 107 that divides the components 105, 106, 108, 109 into independent failure domains. A given item of data is then duplicated across different storage devices 106 in different ones of the failure domains. When a component in one domain fails, the data is then still accessible from one of the other domains. For instance if saving n redundant instances of some data to n respective storage devices 106, then these may be saved to storage devices 106 in different domains that do not share the same trunk switch 108 in the storage fabric topology.

Note also that while failure is referred to in various examples given herein, the same mechanisms can also be applied to accommodate downtime due to other reasons, such as planned maintenance.

Figure 5:
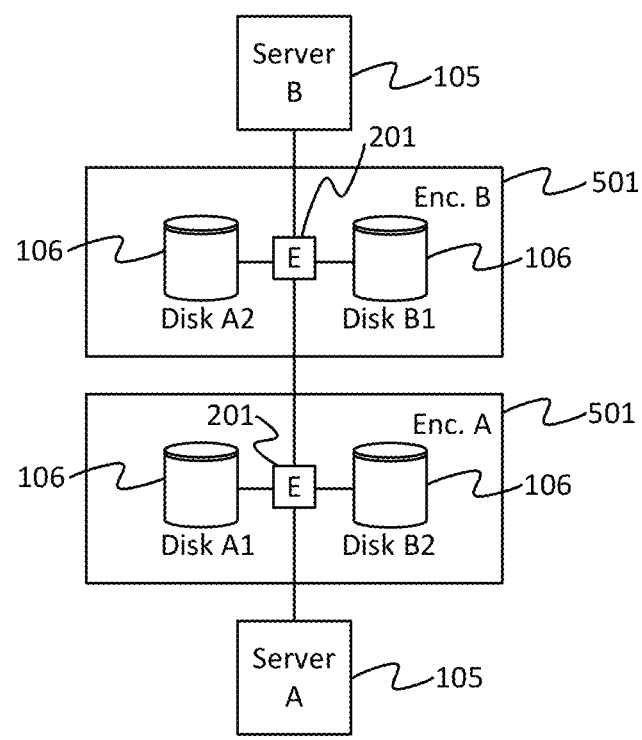

FIG. 5 illustrates an example of the arrangement of the storage fabric 107 into failure domains. The system comprises at least two enclosures 501 (enclosures A and B), each comprising a respective expander 201 providing the functionality of a switch 108. A first server 105 (server A) connects to the expender 201 of enclosure A, and a second server 105 connects to the expander 201 of enclosure B. The two expanders 201 of the two enclosures 501 connect to one another. Each enclosure 501 comprises at least two respective disks 106 which connect to the respective expander 201 of their respective enclosure. Enclosure A comprises at least disks A1 and A2, and enclosure B comprises at least disks B1 and B2. An instance of a first piece of data content is duplicated on both disks A1 and B1. Instances of a second piece of data content are duplicated on both disks A2 and B2. In this arrangement, if any one of the servers 105, disks 106 or expanders fails 201, the first and second data content still remains available via one other of the servers 105, disks 106 and expanders 201. Note also that this scenario can also be dealt with purely by in-band control 114.

A further feature of the API 115 is that it is configured to automatically discover the topology of the storage fabric including the internal topology of the modular switch 301, and to make this information available to the in-band control function 114 and/or out-of-band management function 113. The ability to discover the topology enables the control function 113 or 114 to ensure the topology is correct (no cabling errors or faulty devices) and is composed of all the devices that are required for operation. In embodiments each of the servers 105 is provided with information on the topology of the storage fabric 107 in order to make sure it is correct with respect to the application (in addition to each of the switches 108 also knowing the topology, or at least a local part of it, in order to perform routing).

As mentioned, in embodiments it is possible to adapt not only the mapping of servers 105 to storage devices 106, but also the topology of the modular switch 301 itself. FIGS. 7a, 7b and 8 illustrate the principle behind this.

Figure 6:
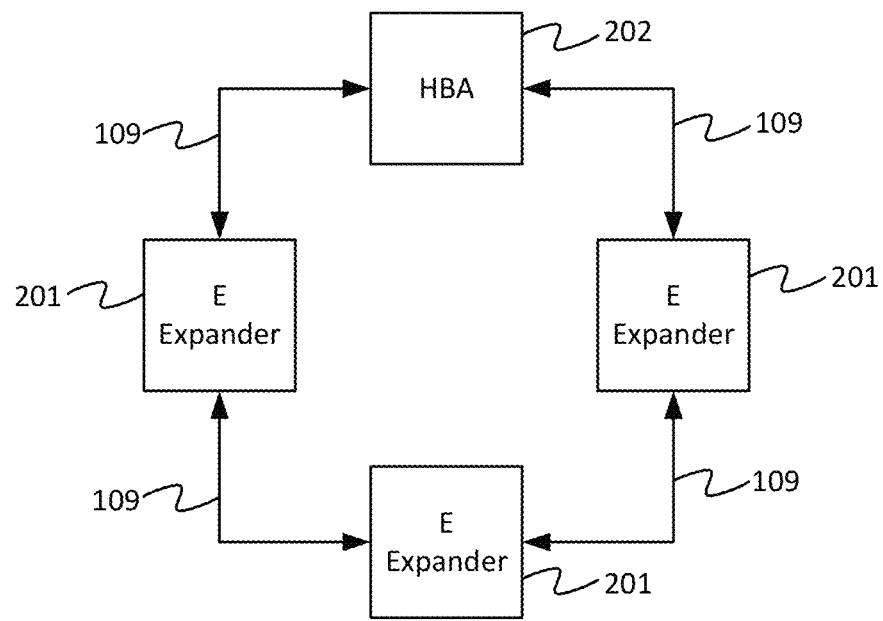

Storage fabrics 107 generally have restrictions on their topology. For instance, routing in SAS prohibits multipath at the SAS layer (multiple possible paths are not allowed between a given server 105 and given storage device 106). So the arrangement shown in FIG. 6—an expander 201 with two SAS switches providing redundant routes to a server's HBA 202—does not work. The behaviour in such a scenario is undefined.

Figure 7:
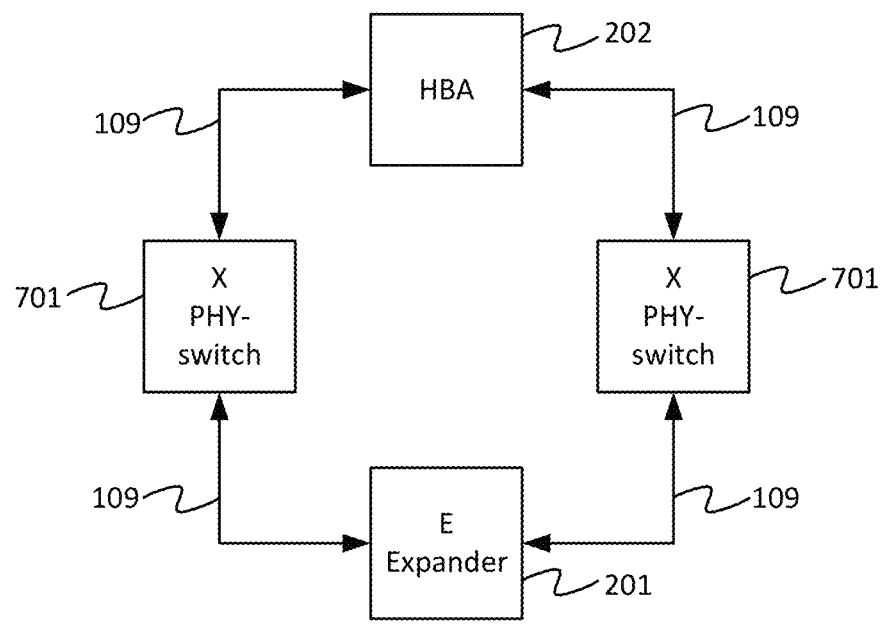

However, it is recognized herein that if two PHY switches 701 are used instead, as shown in FIG. 7, then this does work. That is to say, one or more electrical switches 701 can be used to electrically disconnect and connect a different combination of links 109 between components 105, 106, 108 to create a different topology. Effectively one is electrically connecting and disconnecting links 109, as if a human manger was plugging and unplugging links to/from connectors, but electrically instead of actually mechanically plugging and unplugging. Put another way, the electrical switches 701 virtualize the physical wiring. The electrical switches 701 may for example take the form of transistor based switches, or relays. According to embodiments disclosed herein, these electric switches are arranged to be controllable by the in-band and/or out-of-band control function 113, 114 via the API 115. For example this may allow the human manager 112 to more readily reconfigure the topology of the modular switch 301, and/or it may allow an automated function to dynamically adapt the topology in response to failure and/or changes in demand.

Figure 8:
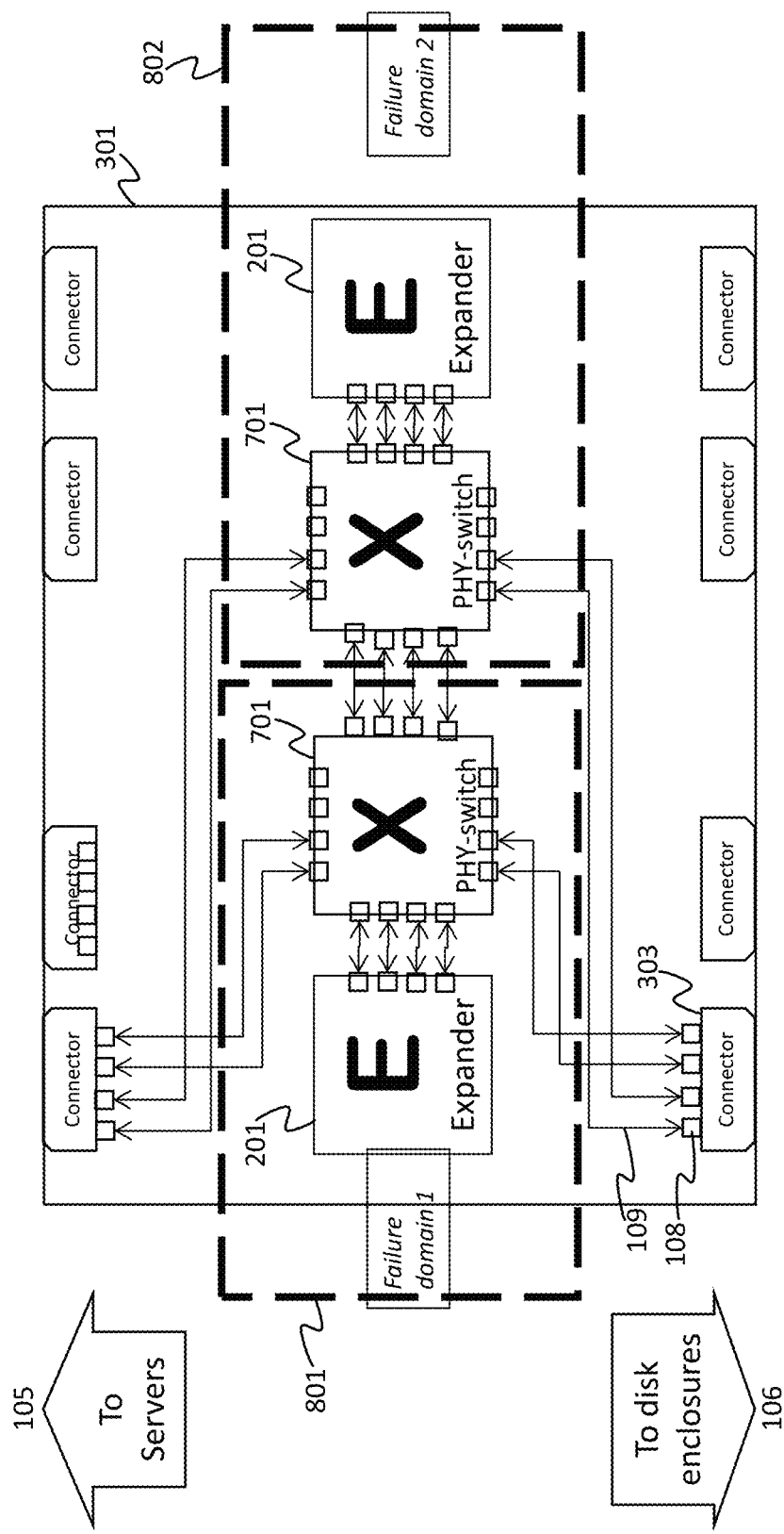

FIG. 8 illustrates an example use of such a technique to accommodate possible failure of a component switch 108. FIG. 8 uses the example of SAS switches 108 formed from SAS expanders 201, but it will be appreciated that a similar technique can be employed for any kind of storage fabric switch (i.e. routing switch) in place of the expanders 201.

In FIG. 8 the illustrated components are divided between two failure domains: a first failure domain 801 and a second failure domain 802. One or more of the connectors 303 provide a plurality of links 109 between at respective ones of the servers 105 and the expanders 201. Internally within the modular switch 301, a first subset (e.g. half) of these links connect to a first expander 201 via a first electrical switch 701 in the first domain 801. A second subset of these internal links (e.g. the other half) connect to a second expander 201 via a second electrical switch 701 in the second domain 802. A further connector 303 provides a plurality of links 109 between respective ones of the storage devices 106 and the expenders 201. Internally within the modular switch 301, a first subset of these links (e.g. half) connect to the first expander 201 via the first electrical switch 701, whilst some others (e.g. the other half) connect to the second expander 201 via the second electrical switch 701. The electrical switches 701 are also connected to one another. The electrical switches 701 may for example take the form of crossbar switches.

In normal operation, the routing between the servers 105 and storage devices 106 connected via the first subsets of links 109 is handled by the first expander 201 in the first failure domain 801, whilst the routing between the servers 105 and storage devices 106 connected via the second subsets of links 109 is handled by the second expander 201 in the second failure domain 802. However, if the expander 201 in one of the domains 801, 802 fails, e.g. say the first failure domain 801, then this can be detected automatically by the control function 113, 114, e.g. the in-band control function 114. In response, the control function automatically controls the electrical switch 701 in the first domain 801 to reconnect all the links 109 previously connected to the first expander 201 to the second expander, so that all the traffic that was previously handled by two expanders 201 in two domains 801, 802 is now routed all via the second expander in the second failure domain 802. Though this has an impact on performance, it may be deemed preferable to the data or services previously provided via the first domain 801 becoming completely inaccessible. Typically it is deemed preferably to retain access to all data at a lower rate than to lose access to part of the data.

In embodiments the connectors 303 may all actually be symmetric and there may be more than are shown here. There may be two failure domains 801, 802 within a box and the connectors 303 may be braided so that half the PHY links 109 from each connector 303 attach into each failure domain 801, 802. The PHY switches 701 may be used to connect up to four PHY links 109 between any pair of connectors 303. Or any two PHY links 109 from a connector can connect to a SAS expander 201 to give fan-out to more than four outputs. If a domain 801 or 802 fails, the braided traces mean that no connectivity is lost, just the bandwidth available is halved.

Figure 9A:
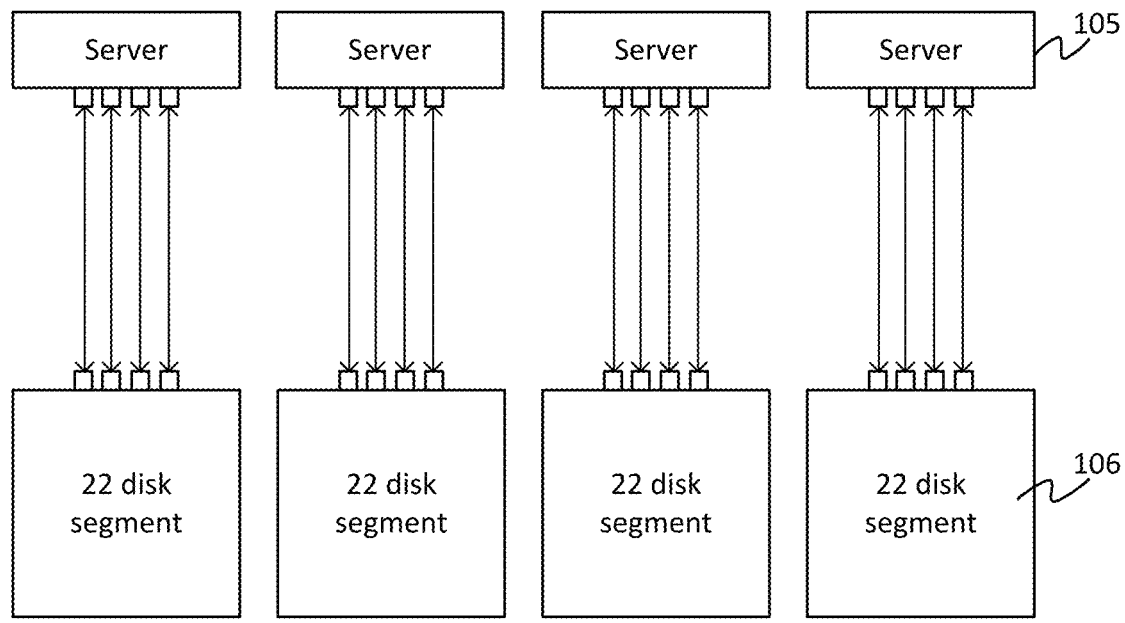
Figure 9B:
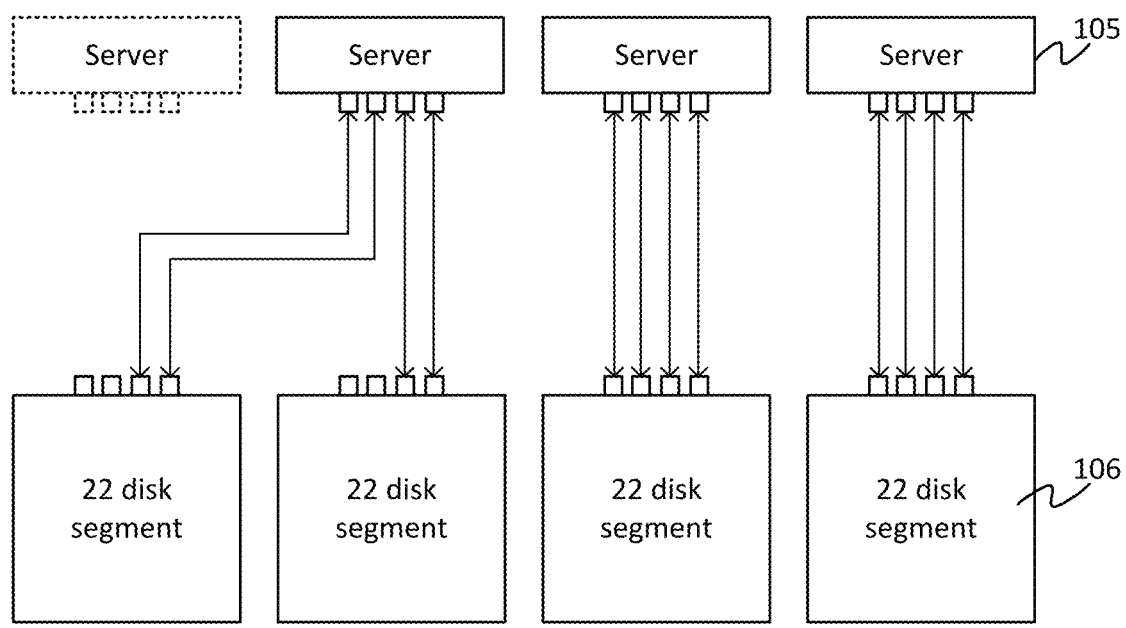
Figure 9C:
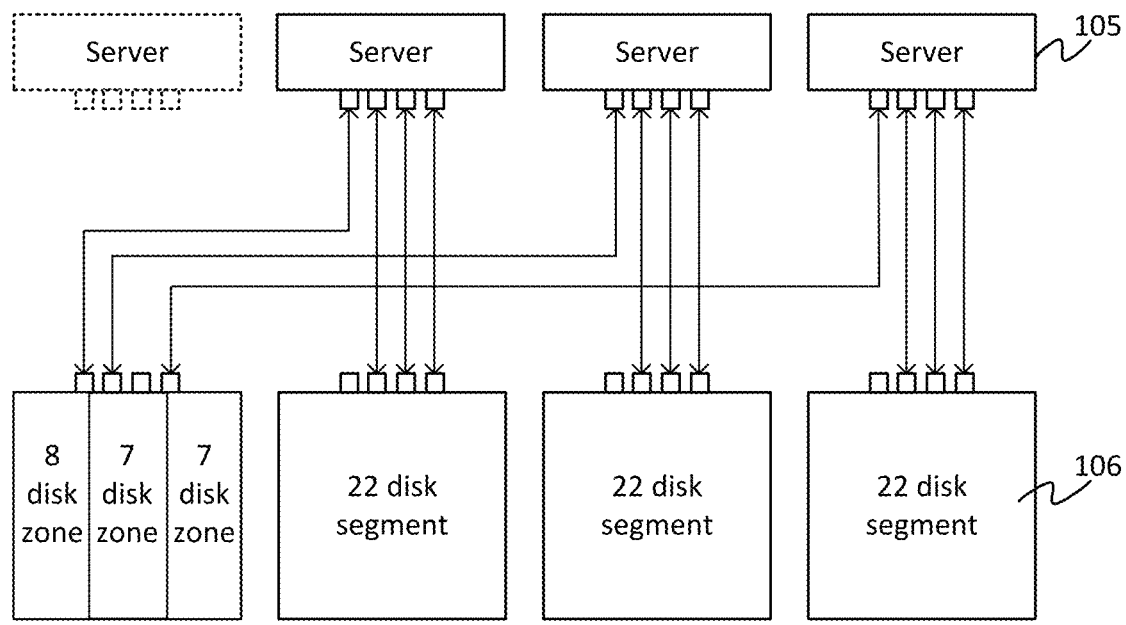
Figure 9D:
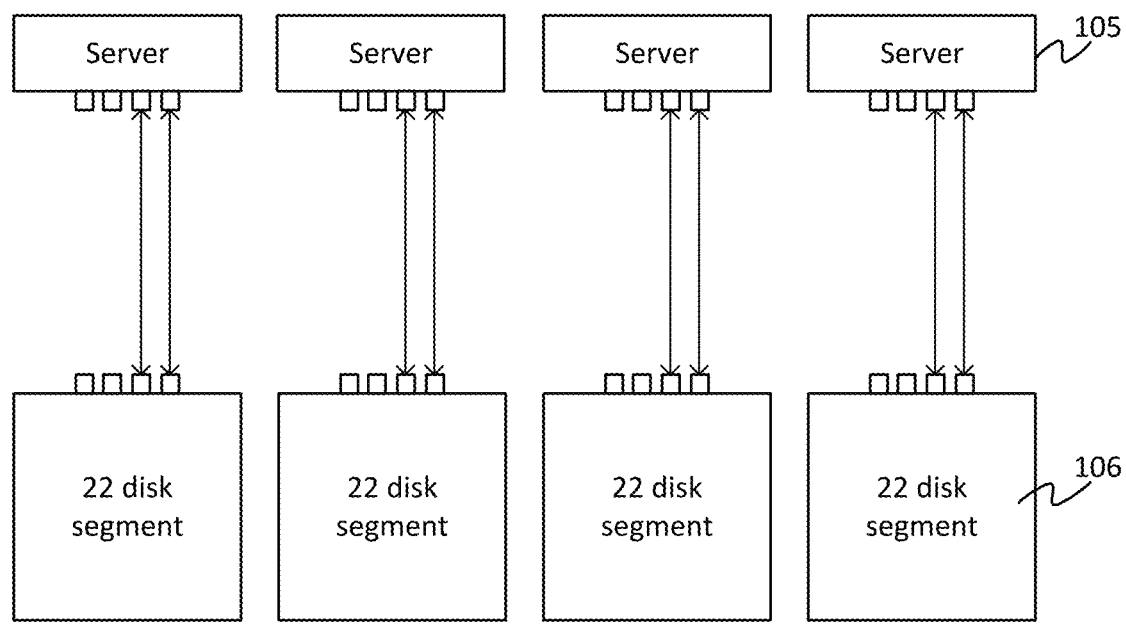

Some further example scenarios are illustrated in FIGS. 9a to 9d. Consider a plurality of servers 105 each attached to a different respective storage device 106 or segment of multiple storage devices, as shown in FIG. 9a. For example there may be four servers 105, each attached to one segment of disks 106, e.g. within a J2010. If one server 105 fails then the storage devices 106 that are attached to it become unavailable. However, using the electrical switches 107 it is possible to reconfigure the connections between the servers 105 and storage devices 106 to keep the storage device available, e.g. as shown in FIG. 9c. Or the disks could shared out amongst the multiple others or all of the other servers 105, e.g. the three other servers in the example shown, as in FIG. 9d. The SAS links are unlikely to be the bottleneck anyway. For instance in the example illustrated, say each link 109 can provide 12 Gbps. In the initial situation before failure, 4×12 Gbps/22 disks gives 272 MBps per disk. If the burden is then split between three links, the bandwidth per link reduces to 3×12 Gbps/22/8=204 MBps. If the burden is then split between two links then the bandwidth per link reduces to 2×12 Gbps/22/8=136 MBps.

Some example scenarios for the use of reconfiguration are as follows, in order from static reconfiguration to dynamic reconfiguration. A first example is to customise the rack at deployment time. This would permit a standard SKU to be reconfigured at deployment between how much of it was storage and how much utility compute. A second example is start and end of life. Initially storage is busy filling up, and at the end of life busy with emptying out its contents. With reconfiguration one may expedite this by using all the servers for I/O at the start and end of life and only use a smaller number of servers for storage in the middle; releasing the rest to use as compute servers for the majority of the life. A third example scenario is to take advantage of the fact that data cools over its lifetime. When the rack first fills with data all the servers might be needed for I/O, but later rather than move the cooler data to a different rack it might be possible to just release some of the servers in the rack for other tasks. As a fourth example, consider a geo-replicated case. Normally the secondary site just takes writes. However if the primary site fails then all the read workload will move to the secondary, so one might want to reconfigure to have more storage servers for the data.

Figure 10:
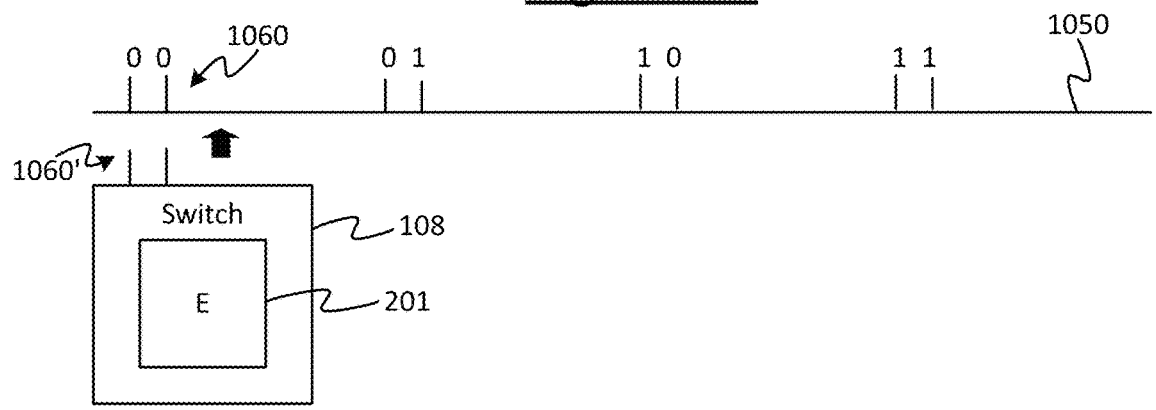
Figure 11:
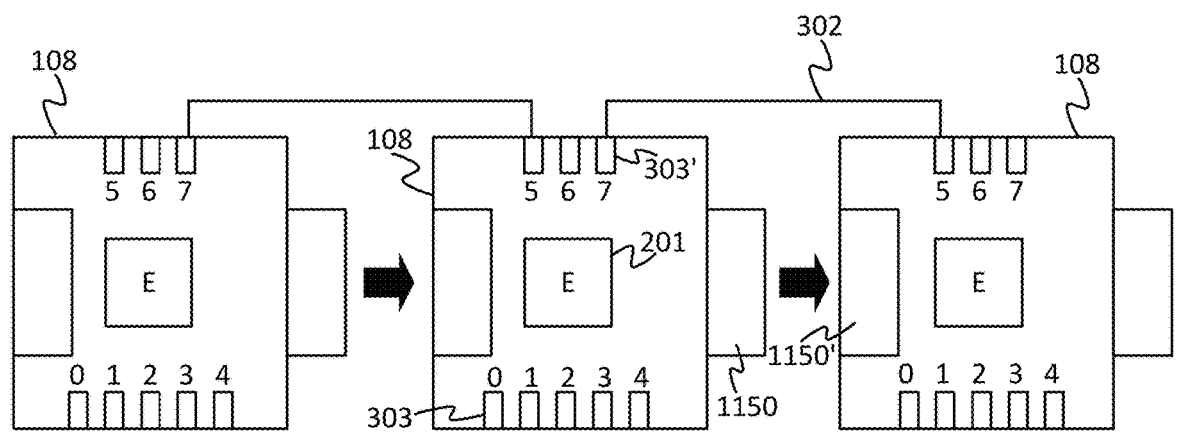

FIGS. 10 and 11 illustrate another feature which, in embodiments, may be employed in conjunction with the modular switch 301. That is, the individual switches 108 can be designed in such a way that the mechanical (i.e. spatial) orientation relative to one another (and not just their network topology) can be discovered by the management function 113. For instance, the management function 113 may be enabled to determine which component switch 108 is to the left or right of which others, or which is above or below which other, or their relative locations in a two or three dimensional spatial array of component switches 108. This enables the management function 113 to output the location of a failed component switched 108 to the human manger 112 via a user interface of the management computer terminal 111. Thus it is easier for the manager 112 to locate failed a component amongst the various other components, of which there may be many in a large, tightly-packed rack or such like.

One example of such a design is shown in FIG. 10. Here the component switches 108 assemble together to form the modular switch 301 by being attached to a common structural element 1050, e.g. a board such as a BMC board. The board 1050 (or other such structure) has a number of mechanical couplings 1060, each of which is designed to couple with a complementary coupling 1060' in any of the component switches 108, and thereby attach the component switch 108 to the board 1050. The couplings 1060 in the board 1050 or other such structure may for example take the form of slots which the component switches 108 can slot into to form the modular switch 301. The couplings 1060 also include a set of male or female pins, or generally contacts, which marry with female or males pins respectively or other such complementary contacts in any instance of the component switch 108. Each set of pins or contacts in each coupling 1060 encodes a different respective spatial address code. Depending on which address a given instance of the modular switch 108 is connected to, this enables the management function 113 to determine whereabouts that modular switch instance 108 is connected spatially within the modular switch 108. The management function 113 can then output an indication of this location to the human manager 112 to help him/her locate the particular component switch 108 in the event that it fails, e.g. so he/she can repair or replace it.

Another example design is shown in FIG. 11. Here each instance of the component switch 108 has a mechanical coupling 1150 on one side and a complementary mechanical coupling 1150' on another side. This allows the individual component switches 108 to be assembled together into an overall modular switch 301 by connecting to one another, without necessarily requiring a separate supporting structure 1050 (through optionally one may be used as well). I.e. the coupling 1050 of one component switch instance 108 couples to the complementary coupling 1150' in another component switch instance 108, and so forth if it is required to build an even larger modular switch 301. In such cases, the connectors of each component switch (via which the links 109 are connected) may be divided into external connectors 303 for forming external links 109e and internal connectors for forming internal links 109i. The connectors 303, 303' have different addresses, and the internal connectors 303 are arranged spatially within each module 108 such that the management function can tell based on the addresses of the connectors forming a certain link 109 whether it is an internal link 109i or external link 109e. Further, the management function 113 can determine from this information which component switch 108 is connected to which side of which other component switch 108. For instance in the example illustrated, by the fact that a first component switch 108 is connected by its connector number 7 to connector number 5 of a second component switch, this tells the management function 113 that this is an internal link 109*i* and that the first switch is to the left of the second switch in the chain. Again, the management function 113 can output such spatial information to the human manager 112 to assist him/her in locating faults.

It will be appreciated that the above-described embodiments have been given only by way of example.

For instance, certain techniques, such as the dynamic adaptation of the mapping of servers 105 to storage devices 106, or the use of electrical switches 701 to adapt a storage fabric topology, have been described herein with reference to a modular switch formed in a modular fashion and having an API presenting the overall modular switch 301 to a control function 113, 114 as a single switch. However, this is not limiting. Techniques such as the dynamic adaptation or the use of the electric switches 701 to adapt topology are not inherently tied to the modularity or API ideas, and in alternative aspects of the present disclosure they may each be used independently or in any combination. For instance the automatic dynamic adaptation of the mapping and/or topology may be employed regardless of modularity. Or the use of the electrical switches 701 may be used to allow the human manager 112 to more readily adapt the topology of the storage fabric 107, regardless of the question of modularity. In other alternative or additional variants, multiple individual switches 108 and/or multiple modular switches 301 may be connected together via external links 109*e* to form the fabric 107.

More generally, other variants or applications of the disclosed techniques may become apparent to a person skilled in the art once given the disclosure herein. The scope of the disclosure is not limited by the disclosed embodiments but only by the accompanying claims.

The invention claimed is:

1. A server system comprising a plurality of components including at least:
   a plurality of processing devices arranged to serve one or more services to one or more client systems via an external network;
   a plurality of storage devices for use by the processing devices to store data relating to said services; and
   a storage fabric connecting the processing devices to the storage devices, the storage fabric, processing devices and storage devices being arranged to operate according to a storage fabric protocol in order to communicate between the processing devices and the storage devices over the storage fabric;
   wherein the storage fabric comprises a plurality of individual switches, and the individual switches have a modular design by which an overall switch is built from the plurality of individual switches;
   the individual switches have individual respective configuration settings, which between them determine which of the processing devices are allocated to use which of the storage devices in providing said services to the client systems;
   the server system further comprises an API enabling an in-band software control function implemented on at least one of the processing devices, which configures the overall switch; and
   the API is operable to receive from the control function an overall mapping of the storage devices to the processing devices instead of requiring the individual configuration settings of each of the individual switches to be specified by the control function, the API being configured to convert the overall mapping into the individual configuration settings of the individual switches to produce said overall mapping.

2. The server system of claim 1, wherein the components are arranged into failure domains, whereby the data relating to one of said services is duplicated across two or more of the storage devices in different ones of the failure domains, the domains being divided such that if one of the components or a link therebetween fails or is shut down in one of the domains, then the data is still accessible from the storage device in another of the domains.

3. The server system of claim 1, wherein the control function comprises an in-band control function implemented on at least one of said components themselves.

4. The server system of claim 1, wherein the control function comprises an out-of-band management function run on a server management computer separate from said components.

5. The server system of claim 4, wherein:
   the modular design of the individual switches comprises connectors between the individual switches having a mechanical design enabling the management function to determine a relative physical orientation of the switches, and based thereon to report a position of a failed one of the switches to a human manager.

6. The server system of claim 4, wherein the management function enables a human manager to manually specify said overall mapping.

7. The server system of claim 1, wherein the control function is configured to dynamically reconfigure the mapping of processing devices to storage devices automatically in response to one or both of:
   failure or other downtime of one of the components or a connection between the components, and/or
   changes in demand for the services from the client systems.

8. The server system of claim 7, wherein the control function is configured to dynamically reconfigure the mapping in response to failure or other downtime of one of the storage devices.

9. The server system of claim 7, wherein the control function is configured to dynamically reconfigure the mapping automatically in response to failure or other downtime of one of the switches, or of a connection to or from one of the switches and another of the components.

10. The server system of claim 1, wherein the API is configured to communicate in-band with switching fabric to discover a topology of the switching fabric, and to make an indication thereof available to the control function and/or one of said components.

11. The server system of claim 1, wherein some or all of the components including at least some of the processing devices, at least some of the storage devices and at least some of the switches connecting between these processing devices and storage devices are all installed in a same server chassis as one another.

12. The server system of claim 1, wherein according to said storage fabric protocol, none of the processing devices is allowed multiple paths to a same one of the storage devices.

13. The server system of claim 1, wherein according to said storage fabric protocol, one, more or all of:
   only one of the processing devices is allowed to control any given one of the storage devices at any one time;
   none of the storage devices is able to operate without being allocated one of the processing devices to control it;

only the processing devices and not any of the storage devices can initiate transactions across the storage fabric;

the processing devices can only communicate with their allocated storage devices over the storage fabric, but none of the processing devices can communicate with any other of the processing devices across the storage fabric, and nor can any of the storage devices communicate with any other of the storage devices across the storage fabric;

and/or the storage devices connect to the external network only via the processing devices to which they are allocated and not directly.

14. The server system of claim 1, wherein according to said storage fabric protocol, one, more or all of:

the communications are conducted according to a bounded latency principle, whereby if the device which initiated the communication does not received an acknowledgment back from the device which is the target of the communication within a maximum time delay, then the communication fails;

the communications conducted over the storage fabric according to said storage fabric protocol are lossless; and/or the communications over the storage fabric are divided into packets and the storage fabric enforces in-order deliver of the packets.

15. The server system of claim 1, wherein the storage fabric protocol is SAS, SATA, Fibre Channel, or PCI.

16. The server system of claim 1, wherein the external network is an IP network.

17. The server system of claim 1, wherein the external network comprises the Internet.

18. A method of operating a server system comprising a plurality of components including at least a plurality of processing devices arranged to serve one or more services to one or more client systems via an external network, a plurality of storage devices for use by the processing devices to store data relating to said services, and a storage fabric connecting the processing devices to the storage devices; the method comprising:

arranging the storage fabric, processing devices and storage devices to operate according to a storage fabric protocol in order to communicate between the processing devices and the storage devices over the storage fabric;

assembling the storage fabric from a plurality of individual switches, the individual switches having a modular design by which an overall switch is built from the plurality of individual switches, wherein the individual switches have individual respective configuration settings, which between them determine which of the processing devices are allocated to use which of the storage devices in providing said services to the client systems;

providing an API enabling an in-band software control function implemented on at least one of the processing devices, which configures the overall switch; and operating the API to receive from the control function an overall mapping of the storage devices to the processing devices instead of requiring the individual configuration settings of each of the individual switches to be specified by the control function, and operating the API to convert the overall mapping into the individual configuration settings of the individual switches to produce said overall mapping.

19. The method of claim 18, wherein the components are arranged into failure domains, whereby the data relating to one of said services is duplicated across two or more of the storage devices in different ones of the failure domains, the domains being divided such that if one of the components or a link therebetween fails or is shut down in one of the domains, then the data is still accessible from the storage device in another of the domains.

20. A server system comprising a plurality of components including at least:

a plurality of processing devices arranged to serve one or more services to one or more client systems via an external network;

a plurality of storage devices for use by the processing devices to store data relating to said services; and a storage fabric connecting the processing devices to the storage devices, the storage fabric, processing devices and storage devices being arranged to operate according to a storage fabric protocol in order to communicate between the processing devices and the storage devices over the storage fabric;

wherein the storage fabric comprises a plurality of individual switches, and the individual switches have a modular design by which an overall switch is built from the plurality of individual switches;

the individual switches have individual respective configuration settings, which between them determine which of the processing devices are allocated to use which of the storage devices in providing said services to the client systems;

the server system further comprises an API enabling a software control function to configure the overall switch; and the API is operable:

to communicate in-band with switching fabric to discover a topology of the switching fabric, and to make an indication thereof available to the control function and/or one of said components, to receive from the control function an overall mapping of the storage devices to the processing devices instead of requiring the individual configuration settings of each of the individual switches to be specified by the control function, and to convert the overall mapping into the individual configuration settings of the individual switches to produce said overall mapping.

* * * * *